United States Patent Office 3,178,262
Patented Apr. 13, 1965

3,178,262

ALKALINE EARTH BROMITES

Jean Meybeck, Mulhouse, Haut-Rhin, René Kircher, Argenteuil, and Jacqueline Breiss, nee Le Clerc, Rueil Malmaison, France, assignors to Societe d'Etudes Chimiques Pour l'Industrie et l'Agriculture, Paris, France
No Drawing. Filed Apr. 9, 1963, Ser. No. 271,582
Claims priority, application France, Apr. 24, 1956, 713,245, Patent 1,216,216; Apr. 6, 1957, 735,806, 735,807; June 25, 1958, 768,739
4 Claims. (Cl. 23—85)

The present invention relates to novel alkaline earth bromites, particularly to barium bromite and strontium bromite, this invention being a continuation-in-part of copending applications Serial Numbers 654,041 and 822,233, filed April 19, 1957, and June 23, 1959, respectively, now Patents No. 3,085,854, issued April 16, 1963, and No. 3,095,267, issued June 25, 1963, respectively.

Alkaline earth bromites such as barium bromite and strontium bromite can be produced by various processes as described in the above-mentioned patents. Before isolation of the pure solid crystalline alkaline earth bromites, a solid composition of matter is obtained containing a major proportion of the crystalline alkaline earth bromite, together with impurities such as the hypobromite or bromide, or bromate or hydroxide or carbonate and mixtures thereof, of the respective alkaline earth metal.

The pure solid crystalline barium bromite is $Ba(BrO_2)_2 \cdot H_2O$, whereas the pure solid crystalline strontium bromite is $Sr(BrO_2)_2 \cdot 2H_2O$. These bromites are definitely identifiable under X-ray examination, as evidenced by the following tabulations wherein interplanar spacings *d* are expressed in Angstrom units, and adjacent each value of *d* is the corresponding microdensitometrical relative intensity measurement *I/I*, for the corresponding pattern line in a powder-radiocrystallography examination.

*Table I*

$Ba(BrO_2)_2 \cdot H_2O$

| *d* | $I/I_1$ | *d* | $I/I_1$ |
|---|---|---|---|
| 8.40 | 5 | 2.14 | 2 |
| 5.82 | 4 | 2.02 | 12 |
| 4.59 | 3 | 1.95 | 4 |
| 4.06 | 3 | 1.92 | 3 |
| 4.05 | 4 | 1.82 | 2 |
| 3.98 | 16 | 1.80 | 2 |
| 3.95 | 5 | 1.77 | 3 |
| 3.63 | 100 | 1.74 | 1 |
| 3.54 | 7 | 1.73 | 1 |
| 3.15 | 4 | 1.70 | 2 |
| 3.02 | 3 | 1.68 | 2 |
| 2.93 | 3 | 1.64 | 1 |
| 2.91 | 6 | 1.59 | 2 |
| 2.88 | 11 | 1.55 | 2 |
| 2.83 | 29 | 1.52 | 5 |
| 2.79 | 5 | 1.498 | 2 |
| 2.64 | 2 | 1.482 | 2 |
| 2.57 | 2 | 1.448 | 2 |
| 2.32 | 10 | 1.427 | 2 |
| 2.29 | 45 | 1.410 | 2 |
| 2.24 | 2 | 1.395 | 3 |
| 2.22 | 3 | 1.323 | 2 |
| 2.18 | 2 | 1.305 | 1 |
| | | 1.275 | 1 |

*Table II*

$Sr(BrO_2)_2 \cdot 2H_2O$

| *d* | $I/I_1$ | *d* | $I/I_1$ |
|---|---|---|---|
| 8.3 | 9 | 1.79 | 12 |
| 5.55 | 4 | 1.78 | 2 |
| 5.38 | 12 | 1.76 | 3 |
| 5.23 | 2 | 1.75 | 2 |
| 4.28 | 10 | 1.73 | 7 |
| 4.25 | 29 | 1.71 | 4 |
| 3.68 | 3 | 1.70 | 3 |
| 3.63 | 41 | 1.680 | 2 |
| 3.51 | 29 | 1.675 | 2 |
| 3.44 | 46 | 1.670 | 3 |
| 3.38 | 12 | 1.660 | 4 |
| 3.03 | 100 | 1.650 | 3 |
| 3.01 | 31 | 1.640 | 2 |
| 2.91 | 15 | 1.630 | 3 |
| 2.83 | 22 | 1.610 | 2 |
| 2.80 | 26 | 1.590 | 1 |
| 2.76 | 4 | 1.580 | 1 |
| 2.71 | 53 | 1.550 | 2 |
| 2.68 | 5 | 1.540 | 2 |
| 2.65 | 4 | 1.520 | 1 |
| 2.60 | 2 | 1.510 | 3 |
| 2.51 | 4 | 1.490 | 2 |
| 2.48 | 3 | 1.475 | 1 |
| 2.34 | 21 | 1.445 | 3 |
| 2.28 | 2 | 1.438 | 1 |
| 2.24 | 2 | 1.423 | 2 |
| 2.22 | 14 | 1.417 | 2 |
| 2.19 | 5 | 1.400 | 1 |
| 2.17 | 2 | 1.385 | 1 |
| 2.16 | 5 | 1.380 | 2 |
| 2.14 | 4 | 1.368 | 2 |
| 2.11 | 5 | 1.350 | 3 |
| 2.09 | 2 | 1.345 | 2 |
| 2.01 | 4 | 1.338 | 1 |
| 1.98 | 3 | 1.320 | 1 |
| 1.95 | 9 | 1.317 | 2 |
| 1.93 | 3 | 1.300 | 3 |
| 1.88 | 3 | 1.285 | 2 |
| 1.87 | 2 | 1.280 | 2 |
| 1.85 | 2 | 1.275 | 2 |
| 1.84 | 3 | 1.270 | 2 |
| 1.82 | 2 | 1.243 | 2 |
| 1.81 | 3 | 1.235 | 2 |
| 1.80 | 2 | 1.220 | 1 |

Both barium and strontium bromites are surprisingly stable compounds in the solid state, thus being particularly suitable for relatively inexpensive transportation. For example, barium bromite crystals have been heated to 58° C. under reduced pressure for about 3 hours without noticeable decomposition. When heated to 80° C. under reduced pressure for 3 hours, about 40% of the initially present bromite is decomposed. The composition of the crystallized solid held under vacuum at 0° C. remains practically unchanged for six months and longer.

It has further been found that a saturated solution of barium bromite containing about 130 grams of active bromine per liter, remains unchanged when exposed to daylight at room temperature for at least three months.

Both barium and strontium bromites are excellent starting materials for the preparation of the alkali metal bromites by cation exchange reaction, for instance, with sodium carbonate. The resultant sodium bromite can then be advantageously employed as a de-sizing agent in textile operations.

It is also to be noted that the alkaline earth bromites of this invention are also useful as oxidizing agents, in general, and are particularly advantageous because of their relative stability under atmospheric conditions.

Without further elaboration it is believed that one skilled in the art can use this invention to its fullest extent. The following examples pertaining to the preparation of barium and strontium bromites are thus merely presented for the purposes of illustration, and are not to be considered in any way limitative of the invention as described in the remainder of the specification and appended claims.

EXAMPLE 1

An aqueous suspension of baryta was prepared by adding 304 g. $Ba(OH)_2$ to 1175 g. water. 284 g. bromine were then added gradually while agitating and cooling the suspension. A barium hypobromite solution was thus obtained having pH 11.2 and containing 221 g./liter active bromine.

This solution was maintained at about 0° C. for 58 minutes, whereupon 55% of the hypobromite content were found to have converted to bromite. $Ba(OH)_2$ was then added in an amount of 16 g./liter to arrest the conversion, raising the pH to 12.9. The unconverted barium hypobromite was eliminated by adding a stoichiometrical quantity of ammonia solution while maintaining the temperature at about −5° C.

During the conversion process a little barium bromate precipitated. The liquid was filtered to separate the precipitate, and a solution was obtained having the following composition by weight:

| | Percent |
|---|---|
| $Ba(BrO_2)_2 \cdot H_2O$ | 3.85 |
| $Ba(BrO)_2$ | 0.4 |
| $BaBr_2$ | 24.2 |
| $Ba(OH)_2$ | 1.15 |

This solution was concentrated in vacuo at the surrounding temperature of about 20° C. until the weight of the solution attained 51.5% of the initial weight. The concentrate was cooled to 0° C. and a solid was precipitated which after removal of the impregnating solution had the following composition by weight:

| | Percent |
|---|---|
| $Ba(BrO_2)_2 \cdot H_2O$ | 64.6 |
| $Ba(BrO_3)_2$ | 3.1 |
| $Ba(OH)_2 \cdot 8H_2O$ | 32.3 |

In this way, 80% of the barium bromite initially present in the solution was precipitated out.

EXAMPLE 2

A barium hypobromite solution was prepared by suspending 270 g. $Ba(OH)_2$ in one liter water and adding bromine in an amount corresponding to 97% of the theoretical quantity required for the formation of hypobromite. The resulting solution titled 220 g./liter active bromine and had a pH 13.6. The solution was adjusted to pH 11.3 by adding an appropriate amount of bromine, and the solution was maintained at a temperature of about 0° C. After 70 minutes of the conversion process, 57.2% of the initial hypobromite were converted into bromite and the solution contained 125.8 g./liter active bromine in the form of barium bromite. This solution was treated in a similar manner to the solution obtained in Example 1.

EXAMPLE 3

An aqueous solution containing 250 g./liter available bromine in the form of strontium hypobromite is prepared by reacting bromine with an aqueous suspension of strontium hydroxide.

After adjusting its pH at 11.3, this solution is maintained at a temperature of about 1° C. during 120 minutes, whereupon about 54% of the hypobromite content is found to have been transformed into strontium bromite. In order to stop the transformation, the pH is then raised to 13 by adding of sufficient quantity of solid strontium hydroxide. The remaining unconverted strontium hypobromite is then eliminated by adding a stoichiometrical quantity of 5–N ammonia solution while the temperature is maintained at about −8° C.

Thereafter some water is evaporated under reduced pressure at a temperature of about 20° C. and a precipitate is obtained which after separation is found to have the following composition by weight:

| | Percent |
|---|---|
| $Sr(BrO_2)_2$ | 37.8 |
| $Sr(BrO)_2$ | 0.41 |
| $Sr(BrO_3)_2$ | 1.98 |
| $SrBr_2$ | 25 |
| $Sr(OH)_2$ | 0.50 |

The balance being water.

This impure solid is dissolved in water at about 0° C. in order to obtain an aqueous solution saturated in strontium bromite, which is then concentrated at ambient temperature (20–25° C.). The precipitate so formed is filtered, washed with an aqueous solution saturated in strontium hydroxide, and dried. There is obtained pale yellow crystals of substantially pure strontium bromite containing 99.2% of $Sr(BrO_2)_2 \cdot 2H_2O$. The solid strontium bromite is a stable compound, its decomposition beginning when heated at about 80° C. By heating at 81° C. during 3 hours, about 3% of the initially present strontium bromite is decomposed.

For numerous industrial uses (for instance as oxidizing agent) it is not necessary to dispose of substantially pure strontium bromite. In this case, the impure solid obtained after evaporation of water and containing 37.8% of $Sr(BrO_2)_2$ is merely washed with 0.1–N strontium hydroxide aqueous solution at a temperature of about 0° C., the quantity of washing solution being about 40% by weight of the solid to be treated. There is obtained after washing and drying, a product with a higher content of strontium bromite having the following composition by weight:

| | Percent |
|---|---|
| $Sr(BrO_2)_2 \cdot 2H_2O$ | 82.1 |
| $Sr(BrO_3)_2 \cdot H_2O$ | 1.4 |
| $SrBr_2 \cdot H_2O$ | 9.2 |
| $Sr(OH)_2 \cdot H_2O$ | 1.4 |
| $SrCO_3$ | 3.7 |
| $Sr(BrO)_2$ | Traces |

EXAMPLE 4

A slurry is formed by adding to 160 g. of water 600 g. of commercial barium hydroxide containing 319.2 g. of $Ba(OH)_2$. 285 g. of bromine are gradually introduced under stirring into this aqueous suspension of barium hydroxide, so as to obtain a suspension of barium hypobromite containing about 28 g. of $Ba(BrO)_2$ per 100 g. of the suspension. About 15.5 g. of bromine are then added to the suspension in order to adjust the pH of the same to 11.2. The suspension is then cooled to a temperature of about 0° C. and permitted to react for about 120 minutes, at which time a maximum of about 64% of the initially contained barium hypobromite has been converted to barium bromite, $Ba(BrO_2)_2$. About 1.5 g. of solid barium hydroxide, $Ba(OH)_2 \cdot 8H_2O$, are then added for every 100 g. of the converted suspension, which amount should be sufficient to raise the pH of the suspension to 12.9, whereby the barium bromite content of the suspension is stabilized.

The solid phase is then separated from the suspension by filtration and a solid crystallized mass containing occluded mother liquor is obtained which has the following composition:

| | Percent |
|---|---|
| $Ba(BrO_2)_2$ | 30.7 |
| $Ba(BrO)_2$ | 0.8 |
| $Ba(BrO_3)_2$ | 15.4 |
| $BaBr_2$ | 24.5 |
| $Ba(OH)_2$ | 1.0 |
| $H_2O$ | 27.6 |

The moist solid mass is recrystallized directly without washing, by adding water to obtain a solution saturated in barium bromite at 0° C. The undissolved barium bromate is eliminated by filtration. By slow evaporation of water at about 30° C. under reduced pressure (15–20 torrs, 1 torr being 1 mm. Hg) and after separation of the precipitate from the solution by decantation or filtration and subsequent washing with an aqueous saturated barium bromite solution, there is obtained a practically pure barium bromite of the following composition:

| | Percent |
|---|---|
| $Ba(BrO_2)_2 \cdot H_2O$ | 98.1 |
| $Ba(BrO_3)_2 \cdot H_2O$ | 1.0 |
| $BaBr_2$ | Traces |

EXAMPLE 5

25 grams of strontium bromite prepared in a similar way as barium bromite in Example 4 are dissolved in 250 grams of 0.02–N strontium hydroxide solution. To the solution so obtained is then added 525 cm.$^3$ of 0.02–N lithium hydroxide solution containing 10.49 g./liter of lithium carbonate. After separation of the precipitated strontium carbonate, the resulting solution is concentrated by water evaporation at room temperature until removing 96.5% of its initial weight. The lithium bromite is separated by filtration and dried in vacuo at about 0° C. to +5° C. There is obtained pale yellow crystals of lithium bromite containing 97.4% of $LiBrO_2 \cdot H_2O$.

EXAMPLE 6

A strontium bromite solution is prepared by dissolving 30 g. of strontium bromite in 300 g. of a 0.02-N strontium hydroxide solution. 44.2 g. of a potassium carbonate solution containing 28.2% by weight of $K_2CO_3$ are added and the pH of the solution so obtained is adjusted to 12.55 by adding 0.57 g. of KOH. The precipitate of strontium carbonate is separated and the resulting solution is evaporated in vacuo at room temperature until obtaining a saturated solution of potassium bromite. This solution is cooled to about −10° C., whereby is obtained a crystalline precipitate of potassium bromite which, after elimination of adherent mother liquor, is found to contain 97.5% of $KBrO_2 \cdot 2H_2O$.

EXAMPLE 7

For the conversion of barium bromite to sodium bromite, the following preferred technique is employed:

In 500 cm.$^3$ of a solution containing 70 g./l. of barium bromite are added 55 g. of an aqueous solution of sodium sulfate containing 25% by weight of $Na_2SO_4$ and the pH of the mixture is adjusted to about 13 by means of sodium hydroxide. The precipitate of barium sulfate is removed by filtration and the filtrate is evaporated in vacuo at room temperature until obtaining a saturated solution of sodium bromite. By cooling to about 0° C., a crystalline precipitate of sodium bromite is obtained. This precipitate is separated, then dried in vacuo at 0° C. whereby crystals of sodium bromite containing 98.1% of $NaBrO_2 \cdot 2H_2O$ are obtained.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. Crystalline $Ba(BrO_2)_2 \cdot H_2O$ having the following main interplanar spacings $d$ expressed in Angstrom units, and adjacent each value of $d$ the corresponding microdensitometrical relative intensity measurement $I/I_1$, for the corresponding pattern line in a powder-radio crystallography examination:

| $d$ | $I/I_1$ | $d$ | $I/I_1$ |
|---|---|---|---|
| 8.40 | 5 | 2.14 | 2 |
| 5.82 | 4 | 2.02 | 12 |
| 4.59 | 3 | 1.95 | 4 |
| 4.06 | 3 | 1.92 | 3 |
| 4.05 | 4 | 1.82 | 2 |
| 3.98 | 16 | 1.80 | 2 |
| 3.95 | 5 | 1.77 | 3 |
| 3.63 | 100 | 1.74 | 1 |
| 3.54 | 7 | 1.73 | 1 |
| 3.15 | 4 | 1.70 | 2 |
| 3.02 | 3 | 1.68 | 2 |
| 2.93 | 3 | 1.64 | 1 |
| 2.91 | 6 | 1.59 | 2 |
| 2.88 | 11 | 1.55 | 2 |
| 2.83 | 29 | 1.52 | 5 |
| 2.79 | 5 | 1.498 | 2 |
| 2.64 | 2 | 1.482 | 2 |
| 2.57 | 2 | 1.448 | 2 |
| 2.32 | 10 | 1.427 | 2 |
| 2.29 | 45 | 1.410 | 2 |
| 2.24 | 2 | 1.395 | 3 |
| 2.22 | 3 | 1.323 | 2 |
| 2.18 | 2 | 1.305 | 1 |
| | | 1.275 | 1 |

2. Crystalline $Sr(BrO_2)_2 \cdot 2H_2O$ having the following main interplanar spacings $d$ expressed in Angstrom units, and adjacent each value of $d$ the corresponding microdensitometrical relative intensity measurement $I/I_1$, for the corresponding pattern line in a powder-radio crystallography examination:

| $d$ | $I/I_1$ | $d$ | $I/I_1$ |
|---|---|---|---|
| 8.3 | 9 | 1.79 | 12 |
| 5.55 | 4 | 1.78 | 2 |
| 5.38 | 12 | 1.76 | 3 |
| 5.23 | 2 | 1.75 | 2 |
| 4.28 | 10 | 1.73 | 7 |
| 4.25 | 29 | 1.71 | 4 |
| 3.68 | 3 | 1.70 | 3 |
| 3.63 | 41 | 1.680 | 2 |
| 3.51 | 29 | 1.675 | 2 |
| 3.44 | 46 | 1.670 | 3 |
| 3.38 | 12 | 1.660 | 4 |
| 3.03 | 100 | 1.650 | 3 |
| 3.01 | 31 | 1.640 | 2 |
| 2.91 | 15 | 1.630 | 3 |
| 2.83 | 22 | 1.610 | 2 |
| 2.80 | 26 | 1.590 | 1 |
| 2.76 | 4 | 1.580 | 1 |
| 2.71 | 53 | 1.550 | 2 |
| 2.68 | 5 | 1.540 | 2 |
| 2.65 | 4 | 1.520 | 1 |
| 2.60 | 2 | 1.510 | 3 |
| 2.51 | 4 | 1.490 | 2 |
| 2.48 | 3 | 1.475 | 1 |
| 2.34 | 21 | 1.445 | 3 |
| 2.28 | 2 | 1.438 | 1 |
| 2.24 | 2 | 1.423 | 2 |
| 2.22 | 14 | 1.417 | 2 |
| 2.19 | 5 | 1.400 | 1 |
| 2.17 | 2 | 1.385 | 1 |
| 2.16 | 5 | 1.380 | 2 |
| 2.14 | 4 | 1.368 | 2 |
| 2.11 | 5 | 1.350 | 3 |
| 2.09 | 2 | 1.345 | 2 |
| 2.01 | 4 | 1.338 | 1 |
| 1.98 | 3 | 1.320 | 1 |
| 1.95 | 9 | 1.317 | 2 |
| 1.93 | 3 | 1.300 | 3 |
| 1.88 | 3 | 1.285 | 2 |
| 1.87 | 2 | 1.280 | 2 |
| 1.85 | 2 | 1.275 | 2 |
| 1.84 | 3 | 1.270 | 2 |
| 1.82 | 2 | 1.243 | 2 |
| 1.81 | 3 | 1.235 | 2 |
| 1.80 | 2 | 1.220 | 1 |

3. A solid composition of matter containing a major proportion of the crystalline barium bromite of claim 1 and a minor proportion of impurities selected from the group consisting of barium hypobromite, barium bromide, barium bromate, barium hydroxide, barium carbonate, and mixtures thereof.

4. A solid composition of matter containing a major proportion of the crystalline strontium bromite of claim 2 and a minor proportion of impurities selected from the group consisting of strontium hypobromite, strontium bromide, strontium bromate, strontium hydroxide, strontium carbonate, and mixtures thereof.

References Cited by the Examiner

UNITED STATES PATENTS

| | | | |
|---|---|---|---|
| 3,085,854 | 4/63 | Meybeck et al. | 23—85 |
| 3,095,267 | 6/63 | Kircher et al. | 23—85 |

OTHER REFERENCES

Gazz. Chim. Ital., 86, 1022–5 (1956).

Gazz. Chim. Ital., 53 (1932), page 203.

Sidgwick book, volume 1, reprinted 1952, page 262, published by Oxford Univ. Press, London.

MAURICE A. BRINDISI, *Primary Examiner.*